US010852483B2

(12) United States Patent
Tan et al.

(10) Patent No.: US 10,852,483 B2
(45) Date of Patent: Dec. 1, 2020

(54) TIME DIVISION MULTIPLEXING CLOSED LOOP FEEDBACK THERMAL CONTROL METHOD AND SYSTEM

(71) Applicant: HUAZHONG UNIVERSITY OF SCIENCE AND TECHNOLOGY, Hubei (CN)

(72) Inventors: Min Tan, Hubei (CN); Zhicheng Wang, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 0 days.

(21) Appl. No.: 16/533,819

(22) Filed: Aug. 7, 2019

(65) Prior Publication Data
US 2019/0391335 A1  Dec. 26, 2019

Related U.S. Application Data

(63) Continuation-in-part of application No. PCT/CN2018/076217, filed on Feb. 11, 2018.

(30) Foreign Application Priority Data

Jun. 30, 2017 (CN) .......................... 2017 1 0520282

(51) Int. Cl.
*G02B 6/12* (2006.01)
*G02B 6/293* (2006.01)
*G02B 6/42* (2006.01)

(52) U.S. Cl.
CPC ..... *G02B 6/29395* (2013.01); *G02B 6/29338* (2013.01); *G02B 6/42* (2013.01); *G02B 6/4215* (2013.01)

(58) Field of Classification Search
CPC .......... G02B 6/12; G02B 6/42; G02B 6/4215; G02B 6/29338
See application file for complete search history.

(56) References Cited

U.S. PATENT DOCUMENTS 9,369,200 B1 * 6/2016 Schmidtke ........... H04B 10/038
9,755,737 B2 * 9/2017 Prakash ............... H04L 41/0663

FOREIGN PATENT DOCUMENTS

| CN | 101968577 | | 2/2011 | |
| CN | 105451412 | | 3/2016 | |
| CN | 107168401 | A * | 9/2017 | ......... G02B 6/29395 |

* cited by examiner

*Primary Examiner* — Jennifer Doan
(74) *Attorney, Agent, or Firm* — JCIPRNET

(57) ABSTRACT

The present disclosure discloses a time division multiplexing closed loop feedback thermal control method and system, and the method is applicable to a system comprising k integrated photonic devices. The method comprises: acquiring, by a temperature control unit, refractive index information of an i-th integrated photonic device in a time division multiplexing manner, refractive indexes of the integrated photonic devices varying with temperature, 1≤i≤k; and adjusting, by the temperature control unit, a temperature of the i-th integrated photonic device when the refractive index of the i-th integrated photonic device is not equal to a desired value to control the refractive index of the i-th integrated photonic device to be maintained at the desired value. When the integrated chip includes multiple photonic devices, a temperature control unit is shared in a time division multiplexing manner, which reduces the overall power consumption of the system.

7 Claims, 3 Drawing Sheets

TIME DIVISION MULTIPLEXING CLOSED LOOP FEEDBACK THERMAL CONTROL METHOD AND SYSTEM

CROSS-REFERENCE TO RELATED APPLICATION

This is a continuation-in-part application of International Application No. PCT/CN2018/076217, filed on Feb. 11, 2018, which claims the priority benefits of China Application No. 201710520282.1, filed on Jun. 30, 2017. The entirety of each of the above-mentioned patent applications is hereby incorporated by reference herein and made a part of this specification.

BACKGROUND

Technical Field

The present disclosure belongs to the field of closed loop thermal control, and more particularly relates to a time division multiplexing closed loop feedback thermal control method and system.

Description of the Related Art

Due to the transmission power consumption limitation, traditional electrical interfaces will be difficult to meet the performance requirements of emerging applications for data transmission. Optical transmission has the potential to break through the performance bottleneck of electrical transmission, but the integration of large-scale photonic devices faces major challenges such as thermal sensitivity. Due to many factors such as the process machining precision and the thermal sensitivity coefficient of the material, it is difficult to completely solve the problem of thermal sensitivity from the level of process and device. Fortunately, the temperature of a single integrated photonic device can be controlled by feedback control so that the thermal sensitivity meets the use requirements. The implementation of the feedback control circuit is the key to this technical solution.

In traditional closed-loop feedback thermal control methods, different photonic devices are controlled through different control loops, that is, one optical device corresponds to one electrical control loop. Since a relatively complicated control method is required in the electrical control loops, the electrical control loops have relatively high power consumption and occupy a large chip area. Therefore, when an integrated chip includes many photonic devices, the traditional closed-loop feedback thermal control methods will introduce a large amount of power consumption due to more electrical control loops, and are not conducive to the integration of large-scale photonic devices due to the overall area limitation of the integrated chip.

SUMMARY

In view of the above-described defects in the art, the present disclosure intends to solve the technical problems that the traditional closed-loop feedback thermal control methods may cause high power consumption when there are many integrated photonic devices and are not conducive to the integration of large-scale photonic devices due to the overall area limitation of the integrated chip.

In order to achieve the above objective, according to an aspect of the present disclosure, there is provided a time division multiplexing closed loop feedback thermal control method, the method being applicable to a system comprising k integrated photonic devices, k being an integer greater than 1, comprising: acquiring, by a temperature control unit, refractive index information of an i-th integrated photonic device in a time division multiplexing manner, refractive indexes of the integrated photonic devices varying with temperature, $1 \leq i \leq k$; and adjusting, by the temperature control unit, a temperature of the i-th integrated photonic device when the refractive index of the i-th integrated photonic device is not equal to a desired value to control the refractive index of the i-th integrated photonic device to be maintained at the desired value.

It should be noted that the above temperature control unit belongs to the core component of the electrical control circuit of the integrated photonic devices.

In the present disclosure, when the integrated chip includes multiple photonic devices, an electrical control loop is multiplexed, which reduces the overall power consumption. In addition, the present disclosure greatly saves the chip area, reduces the cost and improves the market competitiveness of the integrated chip.

Optionally, when the integrated photonic device is a microring resonator, refractive index information of the microring resonator is acquired by acquiring an average power at a drop port of the microring resonator; the refractive index of the microring resonator determines a resonant wavelength of the microring resonator, and when the resonant wavelength of the microring resonator is equal to a corresponding input laser wavelength of the microring resonator, the average power at the drop port of the microring resonator has a maximum value, and the refractive index of the microring resonator is its desired value; the temperature control unit adjusts a temperature of the microring resonator to control the average power at the drop port of the microring resonator to be maintained at the maximum value so that the refractive index of the microring resonator is maintained at the desired value.

Embodiments of the present disclosure are applicable to temperature adjustment of different types of integrated photonic devices. For example, when the integrated photonic device is a microring resonator, the temperature of the microring resonator can be controlled such that its resonant wavelength is equal to the input laser wavelength, and the average power at the drop port of the microring resonator has the maximum value, thereby ensuring the communication quality. Meanwhile, the temperature of the microring resonator is controlled in a time division multiplexing manner so that the microring resonator and other types of integrated photonic devices can share a temperature control unit, thereby reducing the overall power consumption of the system and reducing the chip area, making the integration of large-scale photonic devices possible.

Optionally, when the integrated photonic device is a microring resonator, refractive index information of the microring resonator is acquired by acquiring a conductance of a transmit-side waveguide of the microring resonator; the refractive index of the microring resonator determines a resonant wavelength of the microring resonator, and when the resonant wavelength of the microring resonator is equal to a corresponding input laser wavelength of the microring resonator, the conductance of the transmit-side waveguide of the microring resonator has a minimum value, and the refractive index of the microring resonator is its desired value; the temperature control unit adjusts a temperature of the microring resonator to control the conductance of the transmit-side waveguide of the microring resonator to be maintained at the minimum value so that the refractive index of the microring resonator is maintained at the desired value.

In addition, when the integrated photonic device is a microring resonator, the temperature of the microring resonator can be controlled in a time division multiplexing manner so that the resonant wavelength of the microring resonator is kept equal to the input laser wavelength, and the conductance of the transmit-side waveguide of the microring resonator has a minimum value.

Optionally, the temperature control unit acquires the refractive index of the integrated photonic device and adjusts the heater of the integrated photonic device at a rate greater than the rate of change in temperature of the integrated photonic device.

In the time division multiplexing closed-loop feedback thermal control method according to the present disclosure, since the temperature control unit adjusts the heater of each integrated photonic device at a rate greater than the rate of change in temperature of the integrated photonic device, time division multiplexing is possible. That is, the time division multiplexing closed-loop feedback thermal control method according to the present disclosure can completely replace the traditional closed-loop feedback thermal control method, and has the advantages of low power consumption and high integration, and strong market competitiveness.

According to a second aspect of the present disclosure, there is provided a time division multiplexing closed loop feedback thermal control system, comprising: k refractive index information acquiring units, a multiplexer, a temperature control unit, a demultiplexer, k drives, k heaters, k integrated photonic devices and a timing control unit; the multiplexer includes k input ends, an output end and a control end, and the demultiplexer includes k output ends, an input end and a control end, in which k is an integer greater than 1.

The k input ends of the multiplexer are respectively connected to the k refractive index information acquiring units, the output end of the multiplexer is connected to one end of the temperature control unit, the other end of the temperature control unit is connected to the input end of the demultiplexer, the k output ends of the demultiplexer are respectively connected to the k drives and the k drives are respectively connected to the k heaters; the k heaters respectively control temperatures of the k integrated photonic devices, the refractive index information acquiring units are configured to respectively acquire refractive indexes of the integrated photonic devices, the drives are configured to respectively drive the heaters, and the refractive indexes of the integrated photonic devices vary with temperature.

The timing control unit is respectively connected to the control end of the multiplexer and the control end of the demultiplexer, and is configured to control cyclic breakover of an i-th control loop in a time division multiplexing manner, so that the temperature control unit acquires refractive index information of an i-th integrated photonic device by an i-th refractive index information acquiring unit and adjusts a temperature of the i-th integrated photonic device by an i-th heater to control the refractive index of the i-th integrated photonic device to be maintained at a desired value; the i-th control loop is a loop composed of the i-th integrated photonic device, the i-th refractive index information acquiring unit, an i-th input end of the multiplexer, the temperature control unit, an i-th output end of the demultiplexer, an i-th drive and the i-th heater, in which $1 \leq i \leq k$, and i represents an integer.

Through the control method according to the present disclosure, a plurality of on-chip photonic devices can share a closed-loop temperature control unit in a time division multiplexing manner, which greatly reduces the power consumption of the thermal controller (temperature control unit) and greatly reduces the chip area of the electrical part of the optoelectronic integrated chip, so that further enhancement of the integration density of the optoelectronic integrated chip becomes possible.

Optionally, when the integrated photonic device is a microring resonator and the refractive index information acquiring unit is a photodiode, the photodiode acquires refractive index information of the microring resonator by acquiring an average power at a drop port of the microring resonator; the refractive index of the microring resonator determines a resonant wavelength of the microring resonator, and when the resonant wavelength of the microring resonator is equal to a corresponding input laser wavelength of the microring resonator, the average power at the drop port of the microring resonator has a maximum value and the refractive index of the microring resonator is its desired value; the temperature control unit adjusts a temperature of the microring resonator to control the average power at the drop port of the microring resonator to be maintained at the maximum value so that the refractive index of the microring resonator is maintained at the desired value.

In the embodiments of the present disclosure, different refractive index information acquiring units are designed for different integrated photonic devices. It is possible to multiplex a temperature control unit for different integrated photonic devices. For example, in a case where the integrated photonic device is a microring resonator, since the refractive index of the microring resonator determines a resonant wavelength of the microring resonator, when the resonant wavelength of the microring resonator is equal to the input laser wavelength of the microring resonator, the average power at the drop port of the microring resonator has a maximum value, and thus the refractive index of the microring resonator can be obtained by measuring the average power at the drop port of the microring resonator by the photodiode.

Optionally, when the integrated photonic device is a microring resonator and the refractive index information acquiring unit is a contactless integrated photonic probe, the contactless integrated photonic probe acquires refractive index information of the microring resonator by acquiring a conductance of a transmit-side waveguide of the microring resonator; the refractive index of the microring resonator determines a resonant wavelength of the microring resonator, and when the resonant wavelength of the microring resonator is equal to a corresponding input laser wavelength of the microring resonator, the conductance measured by the contactless integrated photonic probe has a minimum value, and the refractive index of the microring resonator is its desired value; the temperature control unit adjusts a temperature of the microring resonator to control the conductance measured by the contactless integrated photonic probe to be maintained at the minimum value so that the refractive index of the microring resonator is maintained at the desired value.

It should be noted that, in the integrated chip design, different refractive index information acquiring units can be constructed according to different integrated photonic devices. For example, in the case where the integrated photonic device is a microring resonator, it is assumed that when the average power at the drop port of the microring resonator is A, the refractive index of the microring resonator satisfies its desired value. In this case, when the temperature control module determines that the average power at the drop port of the microring resonator is not equal to A, it is determined that the refractive index of the microring resonator does not satisfy its desired value. In addition, in the case where the integrated photonic device is a microring resonator, it can also be assumed that when the conductance of the transmit-side waveguide of the microring resonator is B, the refractive index of the microring resonator satisfies its desired value. The embodiments of the present disclosure are not exhaustive.

It can be understood that, the refractive index related information of the integrated photonic device is collected in a time division multiplexing manner, and temperatures of the plurality of integrated photonic devices are controlled by the same temperature control unit so as to control the respective integrated photonic device to be maintained at its working state, which all fall within the scope of the present disclosure. Optionally, the temperature control unit comprises: an amplifier, a low pass filter, an analog-to-digital converter, a digital signal processing unit and a digital-to-analog converter.

The amplifier has an input end connected to the output end of the multiplexer and is configured to amplify the refractive index of the i-th integrated photonic device output from the multiplexer; the low pass filter has an input end connected to an output end of the amplifier and is configured to filter an output signal of the amplifier; the analog-to-digital converter has an input end connected to an output end of the low pass filter and is configured to convert a signal output from the low-pass filter into a digital signal; the digital signal processing unit has an input end connected to an output end of the analog-to-digital converter and is configured to generate a corresponding temperature adjustment signal according to the digital signal output from the analog-to-digital converter, the temperature adjustment signal being used to adjust the temperature of the i-th integrated photonic device to control the refractive index of the i-th integrated photonic device to be maintained at the desired value; and the digital-to-analog converter has an input end connected to an output end of the digital signal processing unit and is configured to convert the temperature adjustment signal into an analog signal to control the i-th drive and the i-th heater through the i-th output end of the demultiplexer so as to adjust the temperature of the i-th integrated photonic device.

Optionally, the temperature control unit acquires the refractive index of the integrated photonic device and adjusts the heater of the integrated photonic device at a rate greater than the rate of change in temperature of the integrated photonic device.

In general, by comparing the above technical solution of the present inventive concept with the prior art, the present disclosure has the following beneficial effects.

(1) In the present disclosure, a temperature control electrical loop is shared in a time division multiplexing when the integrated chip includes multiple photonic devices, thereby reducing the overall power consumption of the system.

(2) In the present disclosure, a temperature control electrical loop is multiplexed when the integrated chip includes multiple photonic devices, which greatly saves the chip area, reduces the cost, and improves the market competitiveness of the integrated chip.

DETAILED DESCRIPTION OF THE EMBODIMENTS

For more clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure.

Figure 1:
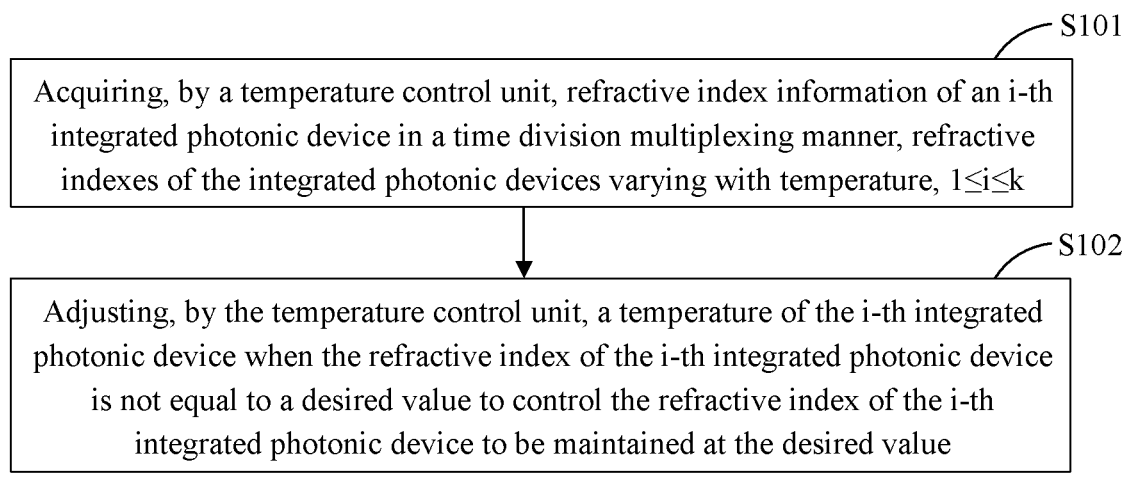
FIG. 1 is a schematic flowchart of a time division multiplexing closed loop feedback thermal control method according to an embodiment of the present disclosure.

FIG. 1 is a schematic flowchart of a time division multiplexing closed loop feedback thermal control method according to an embodiment of the present disclosure. This method is applicable to a system including k integrated photonic devices, in which k is an integer greater than 1. As shown in FIG. 1, the method includes steps S101 to S102.

In the step S101, refractive index information of an i-th integrated photonic device is obtained by a temperature control unit in a time division multiplexing manner, and refractive indexes of the integrated photonic devices vary with temperature.

In step S102, when the refractive index of the i-th integrated photonic device is not equal to a desired value of the refractive index, a temperature of the i-th integrated photonic device is adjusted by the temperature control unit to control the refractive index of the i-th integrated photonic device to be maintained at the desired value.

Optionally, when the integrated photonic device is a microring resonator, the temperature control unit obtains the refractive index information of the microring resonator by acquiring an average power at a drop port of the microring resonator; the refractive index of the microring resonator determines a resonant wavelength of the microring resonator, and when the resonant wavelength of the microring resonator is equal to a corresponding input laser wavelength of the microring resonator, the average power at the drop port of the microring resonator has a maximum value, and the refractive index of the microring resonator is its desired value; the temperature control unit adjusts a temperature of the microring resonator to control the average power at the drop port of the microring resonator to be maintained at the maximum value so that the refractive index of the microring resonator is maintained at the desired value.

Optionally, when the integrated photonic device is a microring resonator, refractive index information of the microring resonator is acquired by acquiring a conductance of a transmit-side waveguide of the microring resonator; the refractive index of the microring resonator determines a resonant wavelength of the microring resonator, and when the resonant wavelength of the microring resonator is equal to a corresponding input laser wavelength of the microring resonator, the conductance of the transmit-side waveguide of the microring resonator has a minimum value, and the refractive index of the microring resonator is its desired value; the temperature control unit adjusts a temperature of the microring resonator to control the conductance of the transmit-side waveguide of the microring resonator to be maintained at the minimum value so that the refractive index of the microring resonator is maintained at the desired value.

In the present disclosure, a temperature control electrical loop is shared in a time division multiplexing when the integrated chip includes multiple photonic devices, thereby reducing the overall power consumption. In addition, the present disclosure greatly saves the chip area, reduces the cost, and improves the market competitiveness of the integrated chip.

Optionally, the temperature control unit acquires the refractive index of the integrated photonic device and adjusts the heater of the integrated photonic device at a rate greater than the rate of change in temperature of the integrated photonic device.

Figure 2:
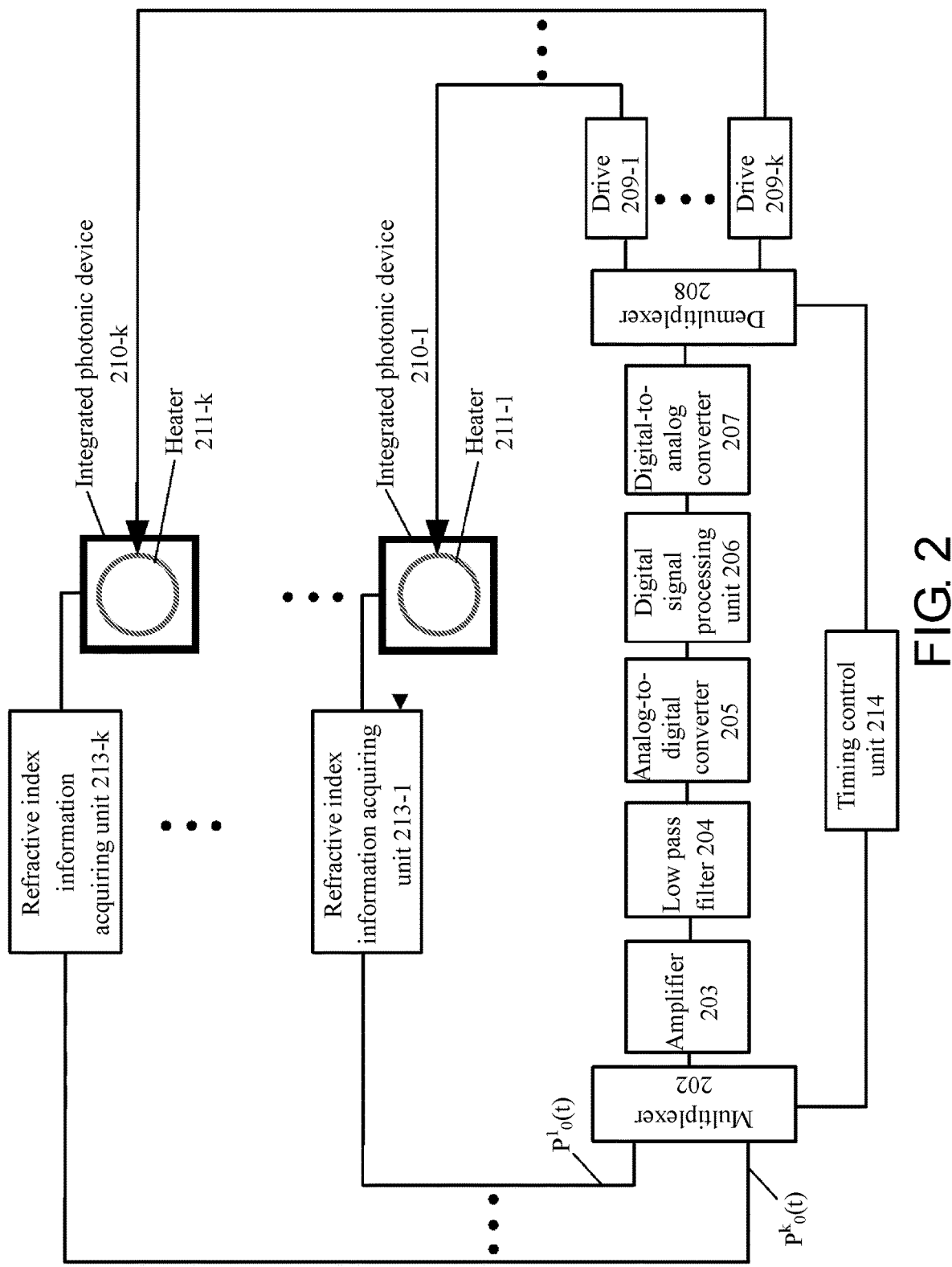
FIG. 2 is a schematic structural diagram of a time division multiplexing closed loop feedback thermal control system according to an embodiment of the present disclosure.

FIG. 2 is a schematic structural diagram of a time division multiplexing closed loop feedback thermal control system according to an embodiment of the present disclosure. As shown in FIG. 2, the system includes a temperature control electrical loop and optical devices. The temperature control electrical loop collects the refractive index information of the optical devices and adjusts temperatures of the optical devices to adjust the refractive indexes of the optical devices.

The temperature control electrical loop mainly includes a multiplexer 202 with k input ends, an amplifier 203, a low pass filter 204, an analog-to-digital converter 205, a digital signal processing unit 206, a digital-to-analog converter 207, a demultiplexer 208 with k output ends, k drives 209 (209-1, 209-2 . . . 209-$k$), k heaters 211 (211-1, 211-2 . . . 211-$k$), k refractive index information acquiring units 213 (213-1, 213-2 . . . 213-$k$) and a timing control unit 214, specific structures and connection relationships of which are as shown in FIG. 2.

The optical devices mainly include k integrated photonic devices 210 (210-1, 210-2 . . . 210-$k$).

Specifically, the amplifier 203, the low pass filter 204, the analog-to-digital converter 205, the digital signal processing unit 206 and the digital-to-analog converter 207 are sequentially connected, and these components can be classified as a temperature control units according to the overall function.

The multiplexer 202 includes k input ends, an output end and a control end. The demultiplexer 208 includes k output ends, an input end and a control end, in which k is an integer greater than 1.

The k input ends of the multiplexer 202 are respectively connected to the k refractive index information acquiring units 213, an output end of the multiplexer 202 is connected to one end of the temperature control unit, the other end of the temperature control unit is connected to an input end of the demultiplexer 208, the k output ends of the demultiplexer 208 are respectively connected to the k drives 209, and the k drives 209 are respectively connected to the k heaters 211. The k heaters 211 respectively control temperatures of the k integrated photonic devices 210, the refractive index information acquiring unit 213 is configured to acquire the refractive index information of the integrated photonic devices 210, and the drives 209 are configured to respectively drive the heaters 211 to adjust temperatures of the respective integrated photonic devices, in which the refractive indexes of the integrated photonic devices vary with temperature.

The timing control unit 214 is respectively connected to the control end of the multiplexer 202 and the control end of the demultiplexer 208, and is configured to control cyclic breakover of an i-th control loop in a time division multiplexing manner, so that the temperature control unit acquires refractive index information of an i-th integrated photonic device 210 by an i-th refractive index information acquiring unit 213 and adjusts a temperature of the i-th integrated photonic device 210 by an i-th heater 211 to control the refractive index of the i-th integrated photonic device 210 to be maintained at a desired value. The i-th control loop is a loop composed of the i-th integrated photonic device 210, the i-th refractive index information acquiring unit 213, an i-th input end of the multiplexer 202, the temperature control unit, an i-th output end of the demultiplexer 208, an i-th drive 209 and the i-th heater 211, in which 1≤i≤k, and i represents an integer.

It should be noted that "$P^1_0(t)$ . . . $P^k_0(t)$" in FIG. 2 indicates that k control loops are cyclically turned on in a time division multiplexing manner.

Figure 3:
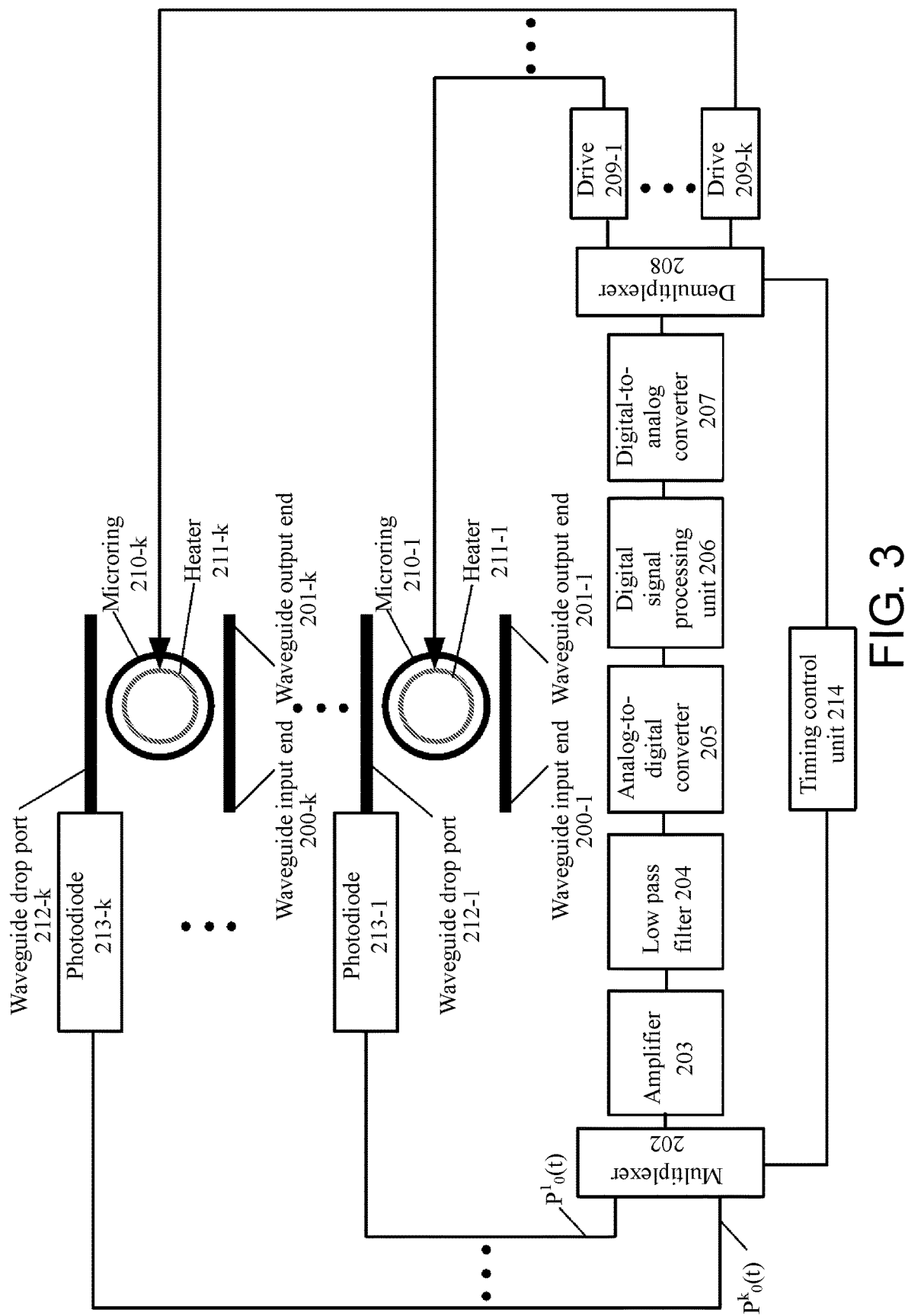
FIG. 3 is a schematic structural diagram of another time division multiplexing closed loop feedback thermal control system according to an embodiment of the present disclosure.

FIG. 3 is a schematic structural diagram of another time division multiplexing closed loop feedback thermal control system according to an embodiment of the present disclosure, and FIG. 3 shows a case where the integrated photonic device is a microring resonator. Description is given by taking all integrated photonic devices as an example. Accordingly, the optical devices include: k waveguide input ends 200 (200-1, 200-2 . . . 200-$k$), k waveguide output ends 201 (201-1, 201-2 . . . 201-$k$), k microring resonators 210 (210-1, 210-2 . . . 210-$k$) and k waveguide drop ports 212 (212-1, 212-2 . . . 212-$k$), in which each waveguide comprises an input end, an output end and a drop port. When a resonant wavelength of the microring resonator is equal to an input laser wavelength of the waveguide, an average power at the waveguide drop port of the microring resonator has the largest value, in which the resonant wavelength of the microring resonator is determined by the refractive index of the microring resonator which varies with temperature. Meanwhile, the refractive index information acquiring unit 213 is a photodiode 213.

The timing control unit 214 controls the cyclic breakover of the i-th control loop in a time division multiplexing manner, so that the temperature control unit acquires the average power at the drop port of the i-th microring resonator and adjusts the temperature of the i-th microring resonator by the i-th heater to control the average power at the drop port of the i-th microring resonator to be maintained at its maximum value. The i-th control loop is a loop composed of an i-th microring resonator, an i-th photodiode, an i-th input end of the multiplexer, a power control module, an ith output end of the demultiplexer, an i-th drive and an i-th heater.

The timing control unit 214 controls the multiplexer 202 and the demultiplexer 208 such that the control loop periodically acquires the average power at the drop port of the respective microring resonator in a time division multiplexing manner and controls the heater according to the information to maintain the average power at the drop port of the respective microring resonator at a maximum value, thereby achieving the purpose of wavelength locking.

It can be understood that FIG. 3 only illustrates a case where all integrated photonic devices are micro-ring resonators. In addition, the integrated photonic devices can be variously designed, and corresponding refractive index information acquiring units can be designed for the different integrated photonic devices to obtain refractive indexes or refractive index related information of the respective integrated photonic devices. This is not limited by the embodiments of the present disclosure.

In addition, when the integrated photonic device is a microring resonator, the refractive index information acquiring unit may also be a contactless integrated photonic probe. FIG. 2 or FIG. 3 may be referred to for specific structures of other components, which will not be specifically illustrated.

The contactless integrated photonic probe acquires refractive index information of the microring resonator by acquiring conductance of a transmit-side waveguide of the microring resonator. The refractive index of the microring resonator determines a resonant wavelength of the microring resonator, and when the resonant wavelength of the microring resonator is equal to a corresponding input laser wavelength of the microring resonator, the conductance measured by the contactless integrated photonic probe has a minimum value.

When the resonant wavelength of the microring resonator is equal to the corresponding input laser wavelength of the microring resonator, the refractive index of the microring resonator is its desired value.

The temperature control unit adjusts a temperature of the microring resonator to control the conductance measured by the contactless integrated photonic probe to be maintained at the minimum value so that the refractive index of the microring resonator is maintained at the desired value.

Through the control method in the present disclosure, a plurality of on-chip photonic devices can share a closed-loop thermal controller in a time division multiplexing manner, which greatly reduces the power consumption of the thermal controller and greatly reduces the chip area of the electrical part of the optoelectronic integrated chip, so that further enhancement of the integration density of the optoelectronic integrated chip becomes possible.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the present disclosure. Therefore, the scope of the present disclosure shall be subject to the scope of protection of the claims.

What is claimed is:

1. A time division multiplexing closed loop feedback thermal control method, the method being applicable to a system comprising k integrated photonic devices, k being an integer greater than 1, comprising:
    acquiring, by a temperature control unit, refractive index information of an i-th integrated photonic device in a time division multiplexing manner, refractive indexes of the integrated photonic devices varying with temperature, $1 \leq i \leq k$; and
    adjusting, by the temperature control unit, a temperature of the i-th integrated photonic device when the refractive index of the i-th integrated photonic device is not equal to a desired value to control the refractive index of the i-th integrated photonic device to be maintained at the desired value.

2. The time division multiplexing closed loop feedback thermal control method according to claim 1, wherein when the integrated photonic device is a microring resonator, refractive index information of the microring resonator is acquired by acquiring an average power at a drop port of the microring resonator; the refractive index of the microring resonator determines a resonant wavelength of the microring resonator, and when the resonant wavelength of the microring resonator is equal to a corresponding input laser wavelength of the microring resonator, the average power at the drop port of the microring resonator has a maximum value, and the refractive index of the microring resonator is its desired value;
    the temperature control unit adjusts a temperature of the microring resonator to control the average power at the drop port of the microring resonator to be maintained at the maximum value so that the refractive index of the microring resonator is maintained at the desired value.

3. The time division multiplexing closed loop feedback thermal control method according to claim 1, wherein when the integrated photonic device is a microring resonator, refractive index information of the microring resonator is acquired by acquiring a conductance of a transmit-side waveguide of the microring resonator; the refractive index of the microring resonator determines a resonant wavelength of the microring resonator, and when the resonant wavelength of the microring resonator is equal to a corresponding input laser wavelength of the microring resonator, the conductance of the transmit-side waveguide of the microring resonator has a minimum value, and the refractive index of the microring resonator is its desired value;
    the temperature control unit adjusts a temperature of the microring resonator to control the conductance of the transmit-side waveguide of the microring resonator to be maintained at the minimum value so that the refractive index of the microring resonator is maintained at the desired value.

4. A time division multiplexing closed loop feedback thermal control system, comprising:
    k refractive index information acquiring units,
    a multiplexer,
    a temperature control unit,
    a demultiplexer,
    k drives,
    k heaters,
    k integrated photonic devices, and
    a timing control unit,
    wherein the multiplexer includes k input ends, an output end and a control end, and the demultiplexer includes k output ends, an input end and a control end, in which k is an integer greater than 1;
    the k input ends of the multiplexer are respectively connected to the k refractive index information acquiring units, the output end of the multiplexer is connected to one end of the temperature control unit, the other end of the temperature control unit is connected to the input end of the demultiplexer, the k output ends of the demultiplexer are respectively connected to the k drives and the k drives are respectively connected to the k heaters; the k heaters respectively control temperatures of the k integrated photonic devices, the refractive index information acquiring units are configured to respectively acquire refractive indexes of the integrated photonic devices, the drives are configured to respectively drive the heaters, and the refractive indexes of the integrated photonic devices vary with temperature;
    the timing control unit is respectively connected to the control end of the multiplexer and the control end of the demultiplexer, and is configured to control cyclic breakover of an i-th control loop in a time division multiplexing manner, so that the temperature control unit acquires refractive index information of an i-th integrated photonic device by an i-th refractive index information acquiring unit and adjusts a temperature of the i-th integrated photonic device by an i-th heater to control the refractive index of the i-th integrated photonic device to be maintained at a desired value; the i-th control loop is a loop composed of the i-th integrated photonic device, the i-th refractive index information acquiring unit, an i-th input end of the multiplexer, the temperature control unit, an i-th output end of the demultiplexer, an i-th drive and the i-th heater, in which 1≤i≤k, and i represents an integer.

5. The time division multiplexing closed loop feedback thermal control system according to claim 4, wherein when the integrated photonic device is a microring resonator and the refractive index information acquiring unit is a photodiode, the photodiode acquires refractive index information of the microring resonator by acquiring an average power at a drop port of the microring resonator; the refractive index of the microring resonator determines a resonant wavelength of the microring resonator, and when the resonant wavelength of the microring resonator is equal to a corresponding input laser wavelength of the microring resonator, the average power at the drop port of the microring resonator has a maximum value and the refractive index of the microring resonator is its desired value;

the temperature control unit adjusts a temperature of the microring resonator to control the average power at the drop port of the microring resonator to be maintained at the maximum value so that the refractive index of the microring resonator is maintained at the desired value.

6. The time division multiplexing closed loop feedback thermal control system according to claim 4, wherein when the integrated photonic device is a microring resonator and the refractive index information acquiring unit is a contactless integrated photonic probe, the contactless integrated photonic probe acquires refractive index information of the microring resonator by acquiring a conductance of a transmit-side waveguide of the microring resonator; the refractive index of the microring resonator determines a resonant wavelength of the microring resonator, and when the resonant wavelength of the microring resonator is equal to a corresponding input laser wavelength of the microring resonator, the conductance measured by the contactless integrated photonic probe has a minimum value, and the refractive index of the microring resonator is its desired value;

the temperature control unit adjusts a temperature of the microring resonator to control the conductance measured by the contactless integrated photonic probe to be maintained at the minimum value so that the refractive index of the microring resonator is maintained at the desired value.

7. The time division multiplexing closed loop feedback thermal control system according to claim 4, wherein the temperature control unit comprises:

an amplifier having an input end connected to the output end of the multiplexer and configured to amplify the refractive index of the i-th integrated photonic device output from the multiplexer;

a low pass filter having an input end connected to an output end of the amplifier and configured to filter an output signal of the amplifier;

an analog-to-digital converter having an input end connected to an output end of the low pass filter and configured to convert a signal output from the low-pass filter into a digital signal;

a digital signal processing unit having an input end connected to an output end of the analog-to-digital converter and configured to generate a corresponding temperature adjustment signal according to the digital signal output from the analog-to-digital converter, the temperature adjustment signal being used to adjust the temperature of the i-th integrated photonic device to control the refractive index of the i-th integrated photonic device to be maintained at the desired value; and a digital-to-analog converter having an input end connected to an output end of the digital signal processing unit and configured to convert the temperature adjustment signal into an analog signal to control the i-th drive and the i-th heater through the i-th output end of the demultiplexer so as to adjust the temperature of the i-th integrated photonic device.

* * * * *